United States Patent
Musser, Jr.

(10) Patent No.: US 7,698,728 B2
(45) Date of Patent: Apr. 13, 2010

(54) AUTOMATED PLAYLIST CHASER

(75) Inventor: Elmer G. Musser, Jr., St. James, NY (US)

(73) Assignee: Home Box Office, Inc., New York, NY (US)

( * ) Notice: Subject to any disclaimer, the term of this patent is extended or adjusted under 35 U.S.C. 154(b) by 1219 days.

(21) Appl. No.: 10/706,025

(22) Filed: Nov. 12, 2003

(65) Prior Publication Data

US 2005/0102695 A1    May 12, 2005

(51) Int. Cl.
   *H04N 7/16* (2006.01)
(52) U.S. Cl. .................................. 725/146; 725/144
(58) Field of Classification Search ............... 725/93, 725/94, 116, 144, 146
   See application file for complete search history.

(56) References Cited

U.S. PATENT DOCUMENTS

| | | | | |
|---|---|---|---|---|
| 5,956,716 A * | 9/1999 | Kenner et al. | ................. | 707/10 |
| 5,987,621 A * | 11/1999 | Duso et al. | ...................... | 714/4 |
| 6,240,105 B1 * | 5/2001 | Zetts | .......................... | 370/503 |
| 6,378,129 B1 * | 4/2002 | Zetts | .......................... | 725/94 |
| 7,159,234 B1 * | 1/2007 | Murphy et al. | ................. | 725/87 |
| 7,318,107 B1 * | 1/2008 | Menon | ........................ | 709/239 |
| 2001/0025377 A1 * | 9/2001 | Hinderks | ..................... | 725/109 |
| 2002/0152278 A1 * | 10/2002 | Pontenzone et al. | ......... | 709/217 |
| 2003/0061305 A1 * | 3/2003 | Copley et al. | ................. | 709/217 |
| 2004/0237120 A1 * | 11/2004 | Lewin et al. | ................. | 725/135 |
| 2005/0060759 A1 * | 3/2005 | Rowe et al. | .................. | 725/143 |

* cited by examiner

*Primary Examiner*—Christopher Kelley
*Assistant Examiner*—Usha Raman
(74) *Attorney, Agent, or Firm*—Mendelsohn, Drucker, & Associates, P.C.; Edward J. Meisarosh; Steve Mendelsohn (57) ABSTRACT

An automated playlist chaser (APC) improves the recovery time and robustness of playlists to component failures and/or human errors in a content sourcing and editing environment. Following detection and correction of an error in a content sourcing subsystem controlled by a playlist, the APC retrieves a last known good playlist from a playlist archive and automatically builds a new playlist for resynchronization of the subsystem. Building the new playlist involves iteratively solving for the first new program segment entry in the new playlist and the new "on-air time," "start-of message," and "duration" attributes for the entry as a function of a reference time (e.g., the present time of day), the original on-air time for the entry, the subsystem recovery time, the APC processing time, and the queuing delay of the audio-video source for the program segment.

31 Claims, 5 Drawing Sheets

TABLE 1

| Entry | On-Air Time | Start-of Message (SOM) | Duration | Program Segment ID | House ID |
|---|---|---|---|---|---|
| 1 | 20:00:00:00 | 01:00:00:00 | 00:20:00:00 | SitcomA – episode 10 | SITA.10 |
| 2 | 20:20:00:00 | 01:00:00:00 | 00:03:00:00 | Promotional spot 9 | PROMO.9 |
| 3 | 20:23:00:00 | 01:20:00:00 | 00:10:00:00 | SitcomA – episode 10 | SITA.10 |

TABLE 2

| Entry | On-Air Time | Pre-Queue Time | Start-of-Message (SOM) | Duration | Media-Type (QueuingDelay) | Program Segment ID | House ID |
|---|---|---|---|---|---|---|---|
| 1 | 20:00:00:00 | 19:59:30:00 | 01:00:00:00 | 00:20:00:00 | Tape (30 s) | SitcomA – episode 10 | SITA.10 |
| 2 | 20:20:00:00 | 20:19:55:00 | 01:00:00:00 | 00:03:00:00 | VidSvr (5 s) | Promotional spot 9 | PROMO.9 |
| 3 | 20:23:00:00 | 20:22:30:00 | 01:20:00:00 | 00:10:00:00 | Tape (30 s) | SitcomA – episode 10 | SITA.10 |

TABLE 3

| Entry | On-Air Time | Pre-Queue Time | Start-of-Message (SOM) | Duration | Media-Type (QueuingDelay) | Program Segment ID | House ID |
|---|---|---|---|---|---|---|---|
| 1 | 20:15:30:00 | 20:15:00:00 | 01:15:30:00 | 00:04:30:00 | Tape (30 s) | SitcomA – episode 10 | SITA.10 |
| 2 | 20:20:00:00 | 20:19:55:00 | 01:00:00:00 | 00:03:00:00 | VidSvr (5 s) | Promotional spot 9 | PROMO.9 |
| 3 | 20:23:00:00 | 20:22:30:00 | 01:20:00:00 | 00:10:00:00 | Tape (30 s) | SitcomA – episode 10 | SITA.10 |

TABLE 4

| Entry | On-Air Time | Pre-Queue Time | Start-of-Message (SOM) | Duration | Media-Type (QueuingDelay) | Program Segment ID | House ID |
|---|---|---|---|---|---|---|---|
| 2 | 20:20:01:00 | 20:19:56:00 | 01:00:01:00 | 00:03:00:00 | VidSvr (5 s) | Promotional spot 9 | PROMO.9 |
| 3 | 20:23:00:00 | 20:22:30:00 | 01:20:00:00 | 00:10:00:00 | Tape (30 s) | SitcomA – episode 10 | SITA.10 |

AUTOMATED PLAYLIST CHASER

BACKGROUND OF THE INVENTION

1. Field of the Invention

The present invention relates to multimedia communications networks and, more specifically, to playlist recovery systems.

2. Description of the Related Art

Recent advances in digital-multimedia-content (DMC) compression, storage, and distribution technologies have led to the availability of hundreds of channels of multimedia services (e.g., movies, live broadcasts, infomercials, advertisements, and music) to the average consumer via satellite direct-to-home (DTH), digital cable, over-the-air (OTH) broadcast high-definition television (HDTV) systems, and broadband Internet.

As the number and variety of multimedia services increase, so does the need to manage the "on-air" aspects of this content. For example, as part of their service offerings, Home Box Office (HBO) (a division of Time Warner Inc.) supplies multimedia programs (e.g., "The Sopranos" and "Sex and the City") via satellite uplink and other high-speed transport systems to service providers (e.g., cable and DTH satellite providers) around the world. With so many paying subscribers viewing their content, HBO and other multimedia service providers have an obligation to minimize interruptions or errors in the streaming of this content from their on-air facilities.

A typical content sourcing facility (e.g., on-air facility for video services) typically includes a redundant cluster of content (e.g., video and audio) sources ultimately feeding an on-air source selector that feeds an uplink transponder or broadband network interface. These content sources commonly include a combination of tape players, live broadcast feeds, and digital video servers. An on-air manager typically is employed to manage a playlist that describes the title, duration, and start/stop times of various pieces of multimedia content or program segments. The playlist is effectively a master document that describes what is played, when, and in what sequence. This list includes not just entries corresponding to relatively long-duration movie or program segments, but also commercials, shorts, and commercial insertion opportunities. It also includes various text, audio, and video segment overlay sequences corresponding to overlap intervals between program segments. The latter includes the well-know "squeeze-and-tease" intervals where, for example, the trailer or credits at the end of one program segment are scaled to a fraction of the screen size and displayed simultaneously with the start of a subsequent program that is scaled to the remaining available screen.

It is common for a playlist to be supported by various editing applications that allow a user to make routine maintenance, or last-minute rush modifications, to the on-air program sequence. Such modifications, especially the last-minute variety, can sometimes result in corruption of the playlist. Additionally, failure of the video content sources (e.g., tape players, pre-recorded media players such as DVD players, and video servers) and/or infrastructure (e.g., switchers, routers, or time-base generators) can lead to the need to recover, edit, and restart a playlist. The process of calculating and restarting a content stream on a backup server or tape unit via correction and reinstantiation of a playlist is called "playlist chasing."

Until recently, the limited number of content channels, as well as the nature of the content sources (e.g., tape playback units), made the task of maintaining and fixing errors in the playlist (i.e., playlist chasing) manageable without significant automation. However, as the variety and number of concurrent streams increase, and the content sources change from easily manageable resources, such as tapes, to less directly manipulable sources, such as video servers, the need has become acute for a system to manage and automatically correct playlist errors.

SUMMARY OF THE INVENTION

Problems in the prior art are addressed in accordance with principles of the present invention by an automated playlist chaser (APC). Following detection and correction of an error in a multimedia subsystem controlled by a playlist, the APC retrieves a last-known good playlist from a playlist archive and automatically builds a new playlist for resynchronization of the subsystem. Building the new playlist involves iteratively solving for the first new program segment entry in the new playlist and the new "on-air time," "start-of message," and "duration" attributes for the entry as a function of the present time-of-day, the original on-air time for the entry, the subsystem recovery time, the APC processing time, and the queuing delay of the audio-video source for the program segment. Depending on the implementation, the APC may be able to update the attributes of two or more overlapped program segments. In addition, the APC may be able to assist a user in making edits to an existing playlist.

One embodiment of the present invention is a method for automatically creating a playlist. The method involves (a) receiving a reference playlist defining a plurality of attributes for each of one or more program segments, the attributes including an on-air time, a start-of message, and a duration for each program segment, (b) comparing at least one on-air time in the reference playlist to a specified reference time, (c) identifying, based on the comparison, at least one program segment in the reference playlist that is active at the specified reference time, and (d) adjusting, based on the at least one identified active program segment, one or more attributes for one or more program segments in the reference playlist to create a new playlist.

Another embodiment of the present invention is an automated playlist chaser adapted to (a) receive a reference playlist defining a plurality of attributes for each of one or more program segments, the attributes including an on-air time, a start-of message, and a duration for each program segment, (b) compare at least one on-air time in the reference playlist to a specified reference time, (c) identify, based on the comparison, at least one program segment in the reference playlist that is active at the specified reference time, and (d) adjust, based on the at least one identified active program segment, one or more attributes for one or more program segments in the reference playlist to create a new playlist.

Another embodiment of the present invention is a content sourcing facility. The facility includes (a) at least first and second content sourcing subsystems, each adapted to generate a subsystem stream of content and an automated playlist chaser (APC). The APC is adapted to (a) receive a reference playlist defining a plurality of attributes for each of one or more program segments, the attributes comprising an on-air time, a start-of message, and a duration for each program segment, (b) compare at least one on-air time in the reference playlist to a specified reference time, (c) identify, based on the comparison, at least one program segment in the reference playlist that is active at the specified reference time, and (d) adjust, based on the at least one identified active program segment, one or more attributes for one or more program segments in the reference playlist to create a new playlist, where at least one of the content sourcing subsystems generates its subsystem stream of content based on the new playlist.

Another embodiment of the present invention is a server that includes at least one processing unit adapted to execute both operating software for managing communication and file operations, and an entire APC application or at least a portion of an APC application, wherein the automated playlist chaser application is adapted to (1) receive a reference playlist defining a plurality of attributes for each of one or more program segments, the attributes including an on-air time, a start-of message, and a duration for each program segment, (2) compare at least one on-air time in the reference playlist to a specified reference time, (3) identify, based on the comparison, at least one program segment in the reference playlist that is active at the specified reference time, and (4) adjust, based on the at least one identified active program segment, one or more attributes for one or more program segments in the reference playlist to create a new playlist.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Exemplary On-Air Facility

Figure 1:
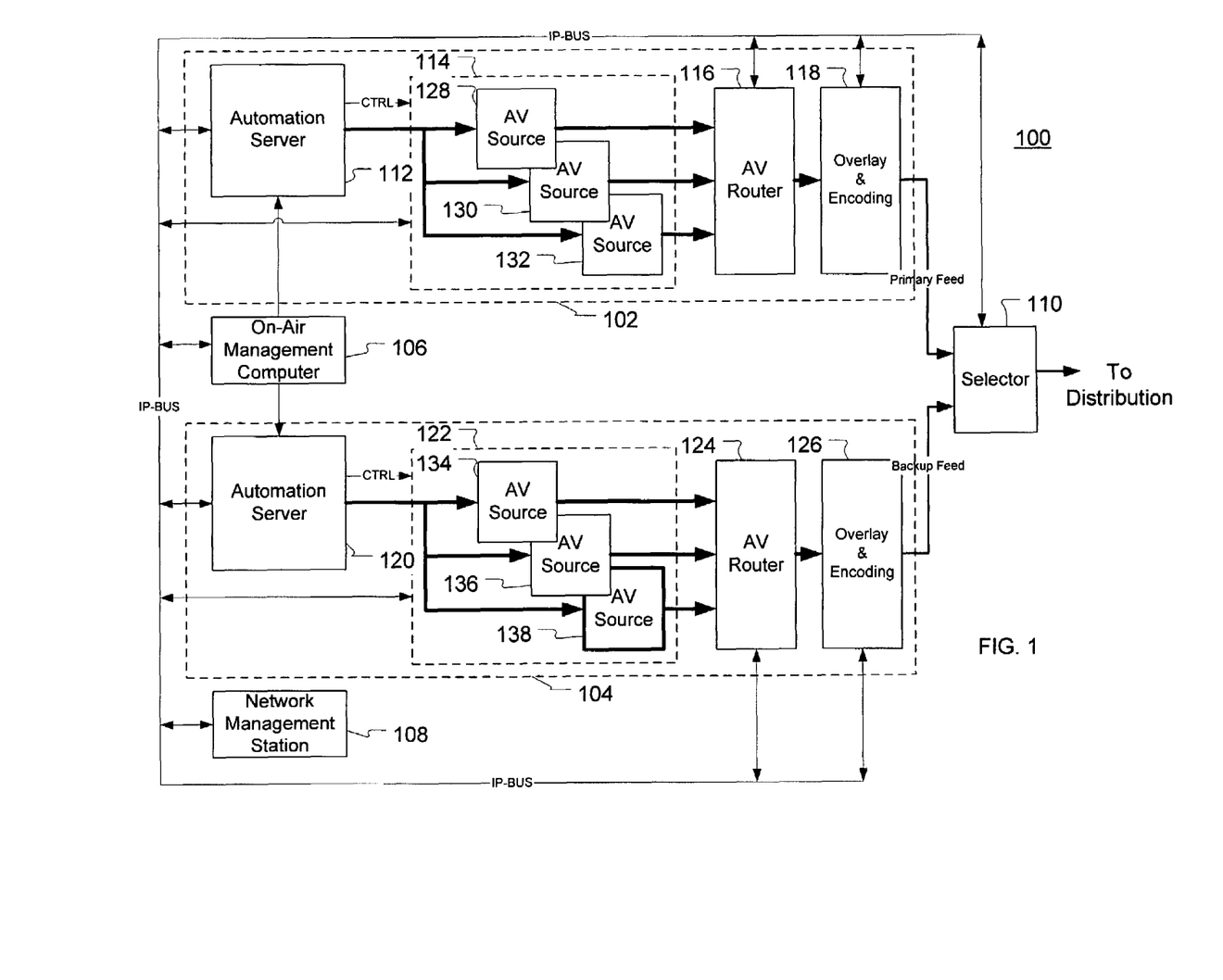
FIG. 1 is a block diagram of an on-air broadcast facility according to one embodiment of the present invention.

FIG. 1 depicts an exemplary on-air broadcast facility 100 of the present invention. Facility 100 includes primary audio and video (AV) content sourcing subsystem 102, backup AV subsystem 104, on-air management computer 106, network management station 108, and selector 110. Primary AV subsystem 102 includes automation server 112, AV source cluster 114, AV router 116, and overlay & encoding device 118. Backup AV subsystem 104 includes automation server 120, AV source cluster 122, AV router 124, and overlay & encoding device 126. Each of AV source clusters 114 and 122 includes one or more AV sources of various varieties. In particular, AV source cluster 114 includes AV sources 128, 130, and 132, while AV source cluster 122 includes AV sources 134, 136, and 138, although other numbers of AV sources in each cluster are possible.

As would be understood to one skilled in the art, each AV source could be a tape player, a video server, a DVD player, a live broadcast feed, or another source of multimedia content. Alternatively or additionally an AV source could be a source of metadata (e.g., content and applets for an interactive program guide). Typically, the output of an AV source will be multiple channels of audio and at least one channel of video (e.g., in uncompressed CCIR-601 digital-video format for standard-definition video or SMPTE-292 digital-video format for high-definition digital video).

CCIR-601 is the generally accepted title of a standard published by the International Radio Consultative Committee (CCIR) for encoding interlaced analog video signals in digital form. More information on the standard can be found in ITU-R Recommendation BT.601-5 (10/95), "Studio encoding parameters of digital television for standard 4:3 and widescreen 16:9 aspect ratios," incorporated herein by reference in its entirety. More information on SMPTE-292 can be found in SMPTE 292M-1998, "Bit-Serial Digital Interface for High-Definition Television Systems," incorporated herein by reference in its entirety.

Each of AV routers 116 and 124 is used to select one of the various AV sources from the local AV cluster and pass the selected output to the local overlay & encoding device. Each of overlay & encoding devices 118 and 126 is used to overlay content information (e.g., text, graphics, and/or voice-overs) onto its input feed and then compress the content (e.g., using MPEG-2 compression) in preparation for long-haul distribution.

At a high level, under normal operation, primary and backup AV subsystems 102 and 104 are configured to source copies of the same, substantially synchronized, multimedia services to selector 110. Selector 110 is configured to pass one of the copies as the "on-air" feed to a long-haul network (e.g., satellite uplink or broadband network) for distribution to major system operators (e.g., cable and/or DTH operators) and ultimately to subscribers. If a failure in the subsystem that sources the on-air feed is detected, then selector 110 can be switched to the other (i.e., "standby") feed, which then becomes the on-air feed. After the subsystem failure has been localized and corrected, the failed subsystem can be brought back on-line and resynchronized with the current on-air feed as the new standby feed.

The failure is localized with the assistance of network management station 108 that monitors the various devices within the broadcast facility. Correction may be done automatically or via human intervention using redundant hardware, tapes, and/or files, and switching elements within the AV subsystem. However, getting the standby AV feed back into synchronization with the current on-air feed is another issue.

To resynchronize the new standby feed with the current on-air feed, it is first determined what is currently playing on the on-air feed. What is playing is a function of the playlist that is executing on the device server of the on-air subsystem. As noted before, the playlist is effectively a master document that describes what is played, when, and in what sequence. The playlist is managed (e.g., edited) by an on-air management application hosted by an on-air management computer (e.g., on-air management computer 106). The on-air management application loads the playlist into automation servers 112 and 120, and the automation servers, in turn, execute the playlist and issue detailed control commands (e.g., timecode commands via an RS-422 control interface) to devices within their respective AV clusters 114 and 122. Initially, both the primary and backup automation servers are loaded with a copy of the same playlist. However, following a failure, the playlist for the failed subsystem needs to be modified. To better understand this, it is helpful to understand that each type of media source (e.g., video server or tape player) has a different queuing delay. The queuing delay is the minimum time from when a media source is instructed to start playing to when the device can actually begin to output content. Additionally, it is helpful to understand the nature of the playlists.

Playlists

Figure 2:
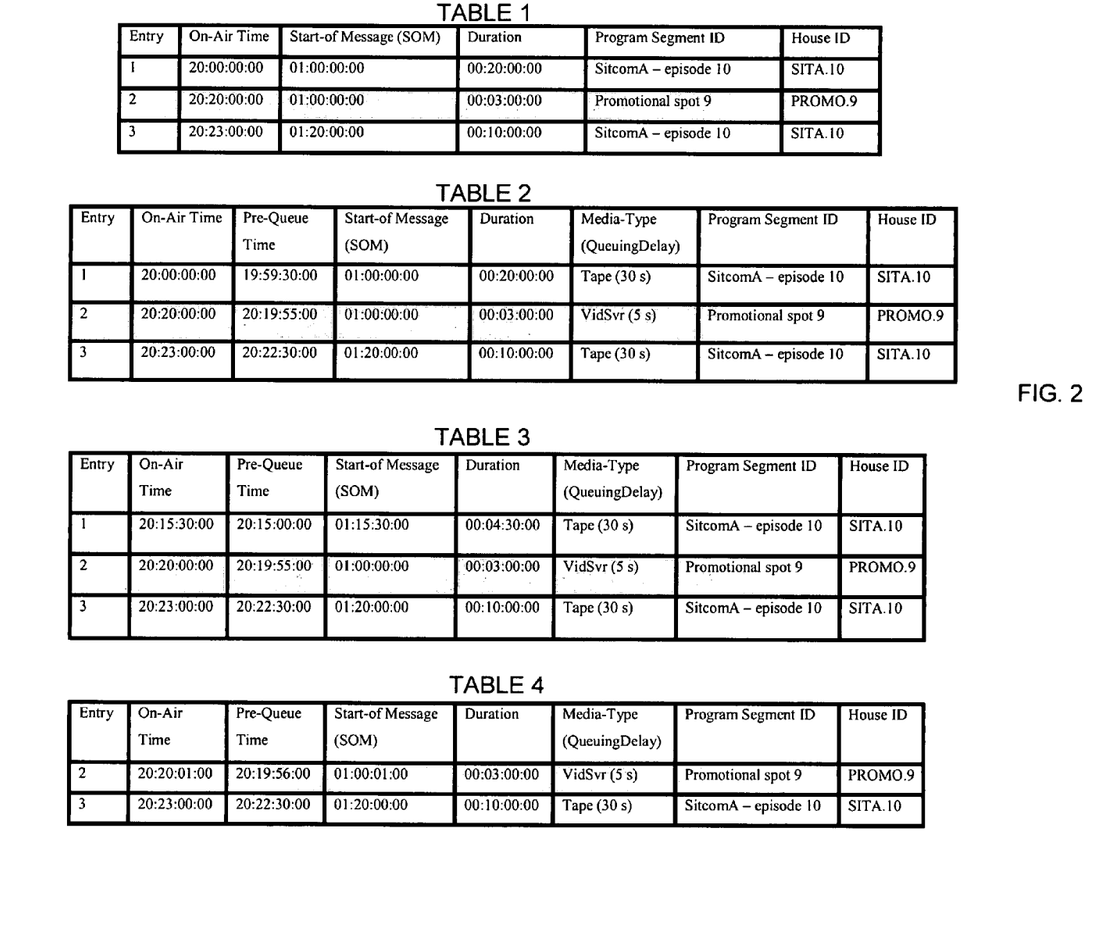
FIG. 2 illustrates TABLES 1 through 4, which represent exemplary playlists according to various embodiments of the present invention.

TABLE 1 of FIG. 2 illustrates an excerpt from an exemplary playlist. It includes an entry for each program segment (e.g., commercial, short, or portion of a larger program) that is played by the facility. For each entry, the playlist includes the following attributes: on-air time, start-of message (SOM), duration, program segment ID, and house ID. The first three attributes are represented in SMPTE timecode and indicate (1) when the program segment is to air, (2) when the segment begins within the program relative to the beginning of the program, and (3) how long the segment is to play, respectively. The last two attributes for each entry are identification labels that are provided by the content originator and broadcast facility, respectively, for identifying the program asset (e.g., a tape).

It should be noted that the playlist, as well as many of the components within a broadcast facility, typically use SMPTE timecode as a universal language for representing time and sequencing control. SMPTE timecode is an absolute reference, for example, to every frame of video in a media source. It is a digital word that is written on, for example, a tape, either as linear timecode (LTC) or vertical interval timecode (VITC). LTC is recorded as an audio signal on an audio track of a media asset using a frequency-modulation scheme. VITC is encoded within the vertical blanking interval portion of a video signal. The timing data in SMPTE takes the form of a twenty-four-hour clock formatted as four two-digit numbers. Note that, generally, timecode is of two primary flavors, so-called "drop-frame timecode" and "non-drop-frame timecode." Film applications typically use non-drop-frame timecode and television applications typically use drop-frame timecode. It is common practice to use semicolons to separate the fields in drop-frame timecode and colons to separate the fields in non-drop-frame timecode. In the present discussion, we have used colons to separate the timecode fields for simplicity. However, rather than complicate the discussion with nuances of drop-frame vs. non-drop-frame timecode differences, a simplified representation of timecode is used herein. The timecode format is hh:mm:ss:ff, where hh is 0 to 23 hours, mm is 0 to 59 minutes, ss is 0 to 59 seconds, and ff is 0 to some maximum frame count. The maximum frame count is a function of the number of frames per second of the media asset. The number of frames per second depends on the international standard that governed the media asset recording. For example, for video recorded at 30 frames per second (fps), ff ranges from 0 to 29. In reality, the frame rates are not always an even divisor of a second; however, details of film, color video, and drop/non-drop timecode can be ignored for the purpose of the present discussion. Therefore, for the present discussion, frame-resolution timing will not be used. More details can be found in the SMPTE timecode reference. SMPTE stands for the Society of Motion Picture and Television Engineers. More information about SMPTE timecode can be found in SMPTE 266M-2002 "Television—4:2:2 Digital Component Systems—Digital Vertical Interval Time Code," and SMPTE 12M-1999 "Television, Audio, and Film—Time and Control Code," each incorporated herein by reference in its entirety.

Referring to the first entry of TABLE 1, note that the on-air time is 20:00:00:00 (e.g., eight PM eastern standard time), the start-of message is 01:00:00:00 (corresponding to the value for the first frame of the media asset), the duration is 00:20:00:00 (corresponding to the first 20 minute segment of the program that will play before the first promotional break), the program segment ID is SitcomA—episode 10 (a label provided by the production crew for that series), and the house ID is SITA.10 (a label provided locally by the "house" or on-air facility). The second entry corresponds to a promotional spot. It has an on-air time of 20:20:00:00 indicating that this program segment will air at 8:20 PM. The SOM is 01:00:00:00 corresponding to the default beginning of the media asset and the duration is three minutes. Finally, the third entry is a ten-minute program segment corresponding to a continuation of SitcomA. Note that the on-air time is 20:23:00:00 and the start-of message is 01:20:00:00 corresponding to a relative offset into the SitcomA media asset of twenty minutes from the start of that asset.

Note that, typically, AV sources, in particular tape players, have a queuing delay, or a time they require to move the AV media asset to a specified reference location and then start to play. Even though, in reality, this time is sometimes dependent (e.g., particularly for linearly-accessed media such as tapes) on the reference location relative to the current read-head location within the media, in general, a fixed queuing delay can be associated with a specific media type (e.g., tape or video server). Note also that queuing delay, as described herein, should be understood to include, for example, the time that it takes for robotic operations or file transfers, which would be required to get a tape into a player, or a file onto a server, respectively. It also includes the time for shuttling of tape and/or server heads to the SOM, as well as pre-roll time. These details are managed by the automation server and/or the AV source itself.

Typically, it is sufficient to instruct the AV source to start playing a certain frame at a certain time and the device will move the tape or read head to the correct frame and pre-roll or spin up mechanically so that it plays the proper frame at the instructed time. However, the AV source should be given this instruction sufficiently in advance of the on-air time to accommodate the source's intrinsic queuing delay. For example, TABLE 1 indicates the first program segment (corresponding to SitcomA) is scheduled to start at 8 PM. If the AV source for SitcomA is a tape player with a queuing delay of 30 seconds, in order for the SitcomA program segment to air on time, the playlist of TABLE 1 should be executed on the automation server early enough so that entry 1 is sent to the tape player from the automation server no later than 30 seconds before 8 PM. TABLE 2 of FIG. 2 is a version of the playlist of TABLE 1 that includes a column labeled "Media-Type (QueuingDelay)." In this column, for each program segment in the TABLE 2, the media-type and the queuing delay attributes associated with the video source of the program segment are listed. Additionally, TABLE 2 includes a column labeled "Pre-Queue Time." In this column, for each program segment, a pre-queue time attribute for each entry is listed that takes into account the queuing delay for each different AV source. Note that these attributes are generally not included in an actual playlist but are added here for clarity of discussion. As illustrated, SitcomA is sourced from tape (which has an exemplary queuing delay of 30 seconds), while the promotional spot is sourced from a video server (which has an exemplary queuing delay of 5 seconds). The pre-queue time for a program segment is the latest time that a command associated with that program segment can be issued to the AV source for that program segment to allow the program segment to start at the specified on-air time. The pre-queue time is the on-air time for a segment minus the queuing delay for the AV source for the segment.

For example, as before, it is still desired to start the first program segment of SitcomA at 8 PM. However, because the queuing delay of the AV source for SitcomA is 30 seconds, the pre-queue time of the program segment is set to 19:59:30:00 or 30 seconds before 8 PM. This indicates the latest time that the AV source can be given the 8 PM start instruction is 30 seconds before 8 PM. Any later and the device is unlikely to be able to play out the segment starting at the SOM reference in time to meet the 8 PM air time.

Similarly, the second entry in the playlist of TABLE 2 corresponding to the promotional spot is sourced by a video server that has a queuing delay of 5 seconds. Consequently, the pre-queue time for the promotional spot entry is 20:19:55:00, which will achieve the actual playing of the spot at 8:20 PM as desired. Likewise, and for similar reasons, the pre-queue time for the third entry is set to 20:22:30:00.

Operation and Exception Handling

Figure 3:
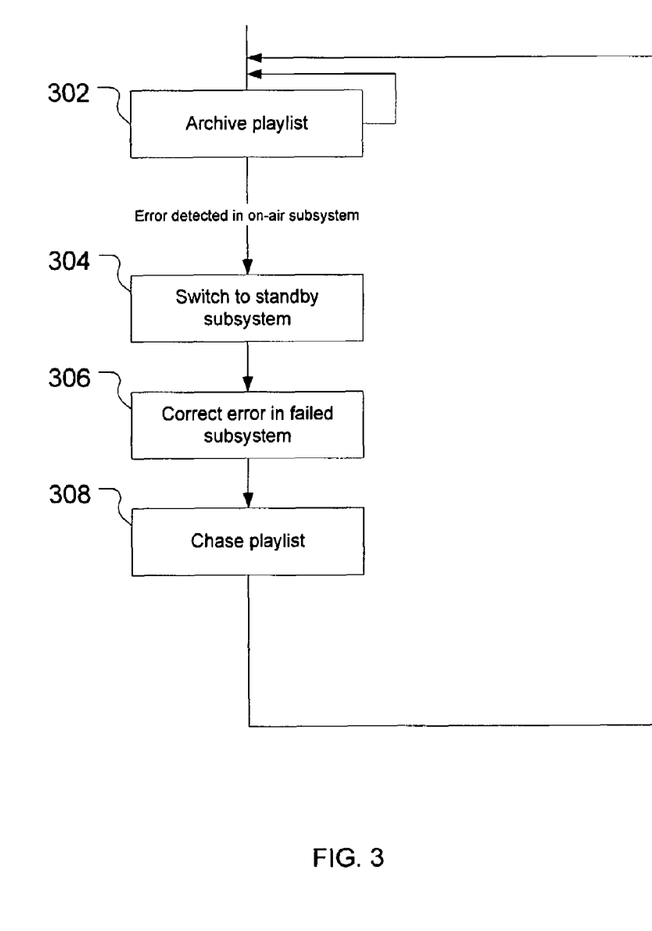
FIG. 3 is a top-level flow diagram showing normal operation and exception handling for a playlist-controlled multimedia facility according to one embodiment of the present invention.

FIG. 3 is a top-level flow diagram showing normal operation and exception handling for a playlist-controlled multimedia facility according to one embodiment of the present invention.

As illustrated, in step 302, the playlist corresponding to the on-air subsystem and other relevant on-air facility status information are archived. This archiving process typically involves storage of a series of full and incremental snapshots of the playlist over time. If an error is detected in the on-air subsystem, then the archiving loop is exited, and in step 304, the standby feed is switched into distribution (see, for example, the discussion surrounding selector 110 of FIG. 1), and in step 306, the error is isolated and corrected. Determining whether an error or failure has occurred in the on-air subsystem could involve a polling of management information bases (MIBs) for managed devices (e.g., automation servers and AV sources) through a simple network management protocol (SNMP) interface, receipt of SNMP traps from an SNMP client on an SNMP manager (e.g., Network Management Station 108 of FIG. 1), custom status query/response mechanisms, or other such error detection schemes for the associated devices as would be understood to one skilled in the art. Once the error is corrected and the failed subsystem is restored to an operational state, then, in step 308, a new playlist for the restored subsystem is created and loaded into that subsystem to get it back in synchronization with the current on-air feed. This process is called playlist chasing. In step 308, an automated playlist chaser (APC) is activated to help build a new playlist for the restored subsystem. Following this, the procedure of FIG. 3 loops back to step 302.

Automated Playlist Chaser (APC)

Figure 4:
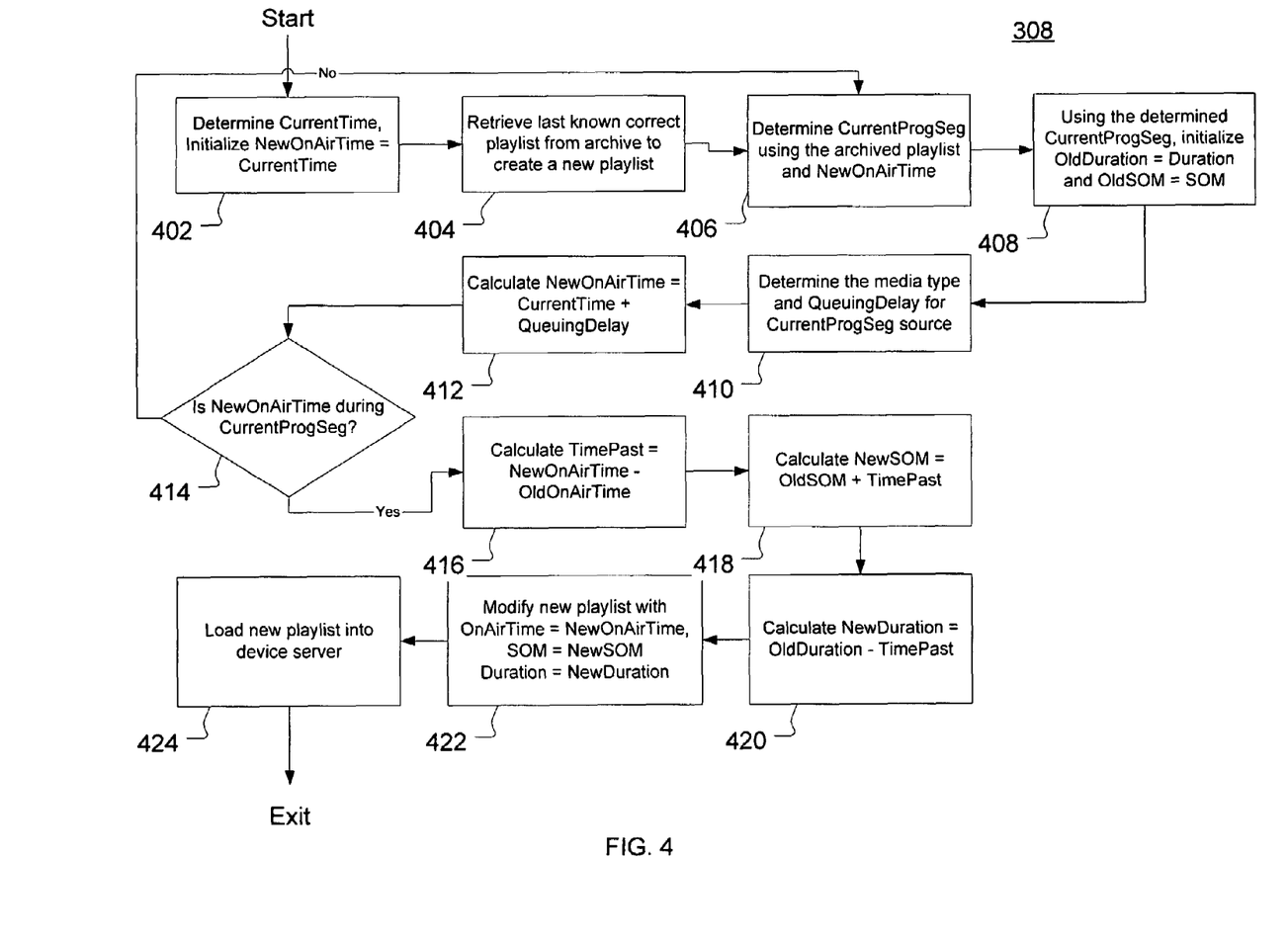
FIG. 4 is a flow diagram of the automated playlist chasing of FIG. 3, according to one embodiment of the present invention.

FIG. 4 illustrates exemplary procedure 308 for playlist chasing executed by an automated playlist chaser according to one embodiment of the present invention. The procedure of the APC could be hosted, for example, on management computer 106 of FIG. 1.

As illustrated, in step 402, a value for the variable CurrentTime is determined by adding the present time-of-day to a processing time. The processing time is an a priori determined period that includes the time for the APC hardware to run procedure 308 including loading and executing the playlist on the target automation server. Thus, CurrentTime is the time at which the command from the automation server associated with the modified playlist will ultimately reach the AV source. Following this, also in step 402, the variable NewOnAirTime is initialized to the value of CurrentTime.

In step 404, the last known correct playlist (e.g., in the event of a hardware failure, the last playlist archived prior to the failure) is retrieved from the playlist archive and is used as a reference to what is currently playing, as well as a template for a new playlist for the recovered AV subsystem. One method (e.g., a playlist validator) that is used to determine a last known correct playlist is to apply a set of rules (e.g., is the duration of a program segment outside the established norms for the facility, are two program segments scheduled to play back-to-back from a linear device where the segments are non-contiguous, does the start time of any program segment violate a queuing or processing delay of a source device) against archived playlists until one is found that violates none of those rules.

In step 406, the current program segment is determined by comparing NewOnAirTime to the on-air times of the program segments in the retrieved playlist. To be more correct, the program segment that is anticipated to be playing when processing time and queuing delays are added to the present time-of-day is determined in step 406 and an identifier for that program segment is stored in the variable CurrentProgSeg.

In step 408, the variables OldDuration and OldSOM are initialized to the values of the attributes SOM and duration of the active program segment, respectively.

In step 410, the media type and consequently the queuing delay (represented by the variable QueuingDelay) are determined for CurrentProgSeg and, in step 412, NewOnAirTime is set equal to the result of the addition of CurrentTime and QueuingDelay.

Next, in the test of step 414, NewOnAirTime is compared with the on-air time and end time (on-air time plus duration) for the program segment identified by CurrentProgSeg. If the NewOnAirTime is outside the playing time for the program segment, then the procedure loops back to step 406 for the determination of a new CurrentProgSeg based on the new value for NewOnAirTime that was calculated in step 412. If, in the test of step 414, it was determined that the NewOnAirTime is within the playing time for the program segment, then the procedure continues with step 416, where TimePast is set equal to the result of the subtraction of OldOnAirTime from NewOnAirTime.

Next, in step 418, NewSOM is set equal to the sum of OldSOM plus TimePast, and in step 420, NewDuration is set equal to the result of the subtraction of TimePast from OldDuration. In step 422, the on-air time, SOM, and duration attributes of the entry corresponding to CurrentProgSeg are updated such that on-air time=NewOnAirTime, SOM=NewSOM, and duration=NewDuration. The program segment identified by CurrentProgSeg is then set to the first entry in the new playlist and the other entries will follow, unmodified, in sequence after CurrentProgSeg. In step 424, the new playlist is loaded into the automation servers corresponding to subsystems whose playlists need to be corrected or synchronized within the system, and the playlist is then executed before the process exits.

As an example of procedure 308, consider the exemplary playlist of TABLE 2 of FIG. 2. Assume that this same playlist is initially running on automation servers for both the primary and backup subsystems (e.g., subsystems 102 and 104 of FIG. 1). Assume further that subsystem 102 is currently the source of the on-air feed and that, at 8:10 PM, a failure is detected in that subsystem by network management station 108. Selector 110 is switched to the backup feed, the failure is then isolated and corrected, and the primary subsystem is restored, either with or without human intervention. Next, the APC is invoked (FIG. 4). For clarity of discussion, assume that the APC is invoked at just before 8:15 PM and can complete its computations, and load and launch a corrected playlist on automation server 112 of subsystem 102 at exactly 8:15 PM (or at least substantially at that time, e.g., within +/−one frame). Thus, the earliest time that an AV source could be instructed to start on the restored subsystem is 8:15 PM.

Referring to the playlist of TABLE 2, it is noted that, at 8:15 PM, SitcomA is playing (15 minutes into the first program segment of SitcomA). By referencing a media-type database for the AV source, the APC determines that SitcomA is being sourced from a tape player with a queuing delay (QueuingDelay) of 30 seconds. Thus, the earliest on-air time for the resumption of SitcomA on the restored subsystem would be thirty seconds after 8:15 PM or 20:15:30:00 in timecode format. This value becomes the on-air time for a new playlist for restored subsystem 102, because no earlier time is feasible given the queuing delay of the AV source.

The APC next needs to adjust the SOM and duration attributes for this entry of the new playlist. To do this, the APC calculates the difference (TimePast) between the new on-air time and the prior on-air time for this program segment. In this case, TimePast=NewOnAirTime−OldOnAirTime=15 minutes and thirty seconds. Next, the SOM for the program segment is modified according to NewSOM=OldSOM+TimePast=01:15:30:00, and the duration for the program segment is adjusted according to NewDuration=OldDuration−TimePast=four minutes and 30 seconds or 00:04:30:00. Note that the other entries of the playlist need not be modified in this example. The new playlist is illustrated by TABLE 3 of FIG. 2, where the pre-queue time and media type attributes have been listed for clarity of illustration.

Note that, if the failure and recovery time of the failed AV subsystem had been different, a different program segment might have been affected. For example, if the AV subsystem had failed at 8:19 PM, and it took two minutes to fix it, calculate a new playlist, and load and execute that playlist, then the program segment that would be affected would be the promotional spot, and the new on-air time for that program segment would be no earlier than 8:21 PM and 5 seconds.

As another example, suppose the AV subsystem failed at 8:17 and 56 seconds, and it took the same two minutes to recover the hardware and calculate, load, and execute a new playlist. In that case, the earliest new playlist execution time would be 8:19 PM and 56 seconds, and the affected program segment would initially be assumed to be entry 1. However, adding the 30 seconds of queuing delay to the earliest start time for entry 1 would put the new on-air time at 8:20 PM and 26 seconds. This new time would be in the middle of the promotional spot (entry 2). Recalculating the on-air time based on entry 2, it is determined that the new playlist's first entry should be the promotional spot, and the on-air time should be 8:20 PM and one second or 20:20:01:00. Using the previously mentioned formulas for calculating SOM and duration yields values of TimePast=1 second, SOM=NewSOM=01:00:01:00, and duration=NewDuration=00:02:59:00. The updated playlist corresponding to this example is illustrated by TABLE 4 of FIG. 2.

Overlapped Program Segments

In some cases, a playlist includes two or more program segments that are fully or partially overlapped in time. As would be understood by one skilled in the art, for these cases, a modified version of the procedure of FIG. 4 can be used according to one or more embodiments of the present invention. In the modified procedure, the loop of steps 406, 410, 412, and 414 is repeated until all potential overlapped program segments have been identified. The earliest NewOnAirTime is then determined corresponding to the latest NewOnAirTime associated with any of the identified overlapped program segments. Using this NewOnAirTime, the SOM and duration for each program segment is recalculated as before, and the new playlist is created, loaded, and executed.

Other Scenarios and Applications

There are other failure scenarios for which the automated playlist chaser is useful. In addition to hardware failures, it should be noted that, because the on-air management application provides an interface for users or other programs to modify the playlist, there is also the possibility of playlist corruption of one form or another.

Playlist Corruption

One significant error that can be made by a user while editing a playlist is termed "unthreading." This can occur when a user accidentally enters an "unqueue global" command into the playlist. Such a command tells a robotic tape jukebox to effectively "take all the tapes and put them back in the bins." This command results in a complete stoppage of the AV programs currently in progress. One approach designed to minimize the impact of this problem is having any edits performed on a playlist only copied to one AV subsystem (e.g., the on-air subsystem). Then, if an edit error is encountered, at least the standby system is still running the uncorrupted playlist and it can be switched to in order to recover the system quickly. The edits are eventually copied to the standby system, but typically with some lag time that can help one catch the problem before it corrupts the standby feed. Once the problem is identified and isolated in time. The APC can be invoked to assist in the creation of a new playlist that does not exhibit the problem, and that also is in synchronization with the on-air feed.

As another example, assume it is 8:10 PM, the playlist of TABLE 2 is executing on primary and backup subsystems (e.g., subsystems 102 and 104 of FIG. 1), and a user decides that, at 8:15 PM, he is going to insert a one-minute promotional spot for an upcoming episode of "Sex and the City." He makes all the necessary playlist changes and loads the new playlist into at least the automation server for the on-air AV subsystem (e.g., subsystem 102), but forgets to transfer the new promotional spot to the video server designated as the source for the new spot. At 8:15 PM, the video server reports the missing program segment, and the error is picked up by the network management station. The selector (e.g., selector 110) is switched to the standby feed, and the APC is invoked. The APC retrieves the last known good playlist (e.g., the last playlist to be archived prior to the faulty edit) and creates a new playlist that gets loaded into at least the automation server of the subsystem that was taken off-air, and the problem is corrected.

Of course, ultimately, the video server is loaded with the new spot, the playlist is again modified by the user, and the spot gets played later. This process is known in the field as a "make good."

B-Roll Scenario

In a B-roll scenario, a live broadcast on an on-air feed (for example, running on primary AV subsystem 102 of FIG. 1) is backed up by an alternative program running on a standby feed (e.g. backup AV subsystem 104 of FIG. 1). In the event of a failure in the live feed, the selector is switched to the standby feed, and the alternative programming replaces the on-air live broadcast. Once the on-air feed is recovered, the playlist for the live-feed should be synchronized with the playlist for the alternative programming before switching back to live programming. As can be appreciated, this synchronization ensures that any promotional spots that are in progress are not interrupted or any that are subsequently planned will still air at the appropriate time. By invoking the APC, a new playlist for the live feed that meets all the synchronization requirements of the system can be quickly created, and the live feed can be quickly reactivated.

East/West Feeds

Figure 5:
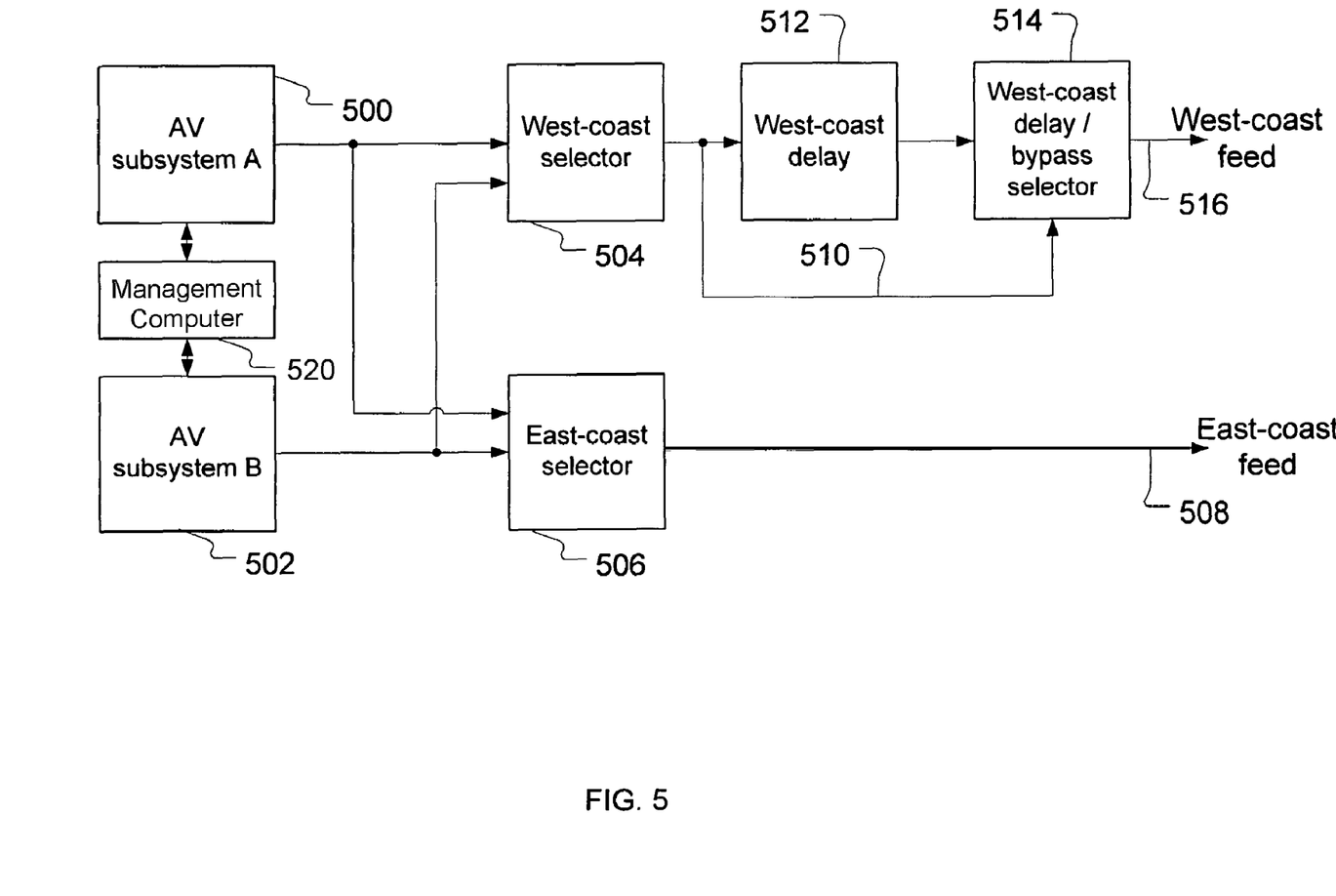
FIG. 5 is a high-level block diagram of a section of a broadcast facility directed to the sourcing of multiple broadcast feeds that are relatively delayed in time according to one embodiment of the present invention.

FIG. 5 is a top-level diagram of a section of a broadcast facility directed to the sourcing of multiple broadcast feeds that are delayed in time relative to each other according to one embodiment of the present invention. Specifically illustrated are East-coast and West-coast feeds (e.g., HBO-E and HBO-W), each of which services a different time zone (e.g., the East-coast feed services the eastern standard time (EST) time zone and the West-coast feed services the pacific standard time (PST) time zone). The exemplary broadcast facility includes AV subsystem A 500 and AV subsystem B 502, each of which feeds both West-coast selector 504 and East-coast selector 506. East-coast feed 508 is the output of East-coast selector 506. Output 510 of West-coast selector 504 feeds West-coast delay unit 512 and West-coast delay/bypass selector 514. West-coast delay unit 512 delays the AV feed by a programmable amount of time (e.g., three hours) to accommodate a later air-time for the West-coast region. The output of West-coast delay unit 512 and the output of West-coast selector 504 both feed West-coast delay/bypass selector 514, whose output is West-coast feed 516.

Under normal operating conditions, one of AV subsystems 500 and 502 is chosen by on-air management computer 520 as the on-air source for both the East-coast feed and the West-coast feed, and the other is used as a hot standby. In such a configuration, both AV subsystems typically run copies of the same playlist that is sourced to it by an automated playlist chaser running on management computer 520. For example, if AV subsystem A 500 is chosen as the on-air source, then each of West-coast selector 504 and East-coast selector 506 is configured to pass the feed from AV subsystem A 500 to its output and ignore the feed from AV subsystem B 502. AV subsystem A 500 is thus the source of the East-coast feed and the input to West-coast delay unit 512. Again, under normal operating conditions, West-coast delay unit 512 delays its AV feed input (nominally by three hours), and its output is selected by West-coast delay/bypass selector 514 as West-coast feed 516. If a failure occurs in the on-air AV subsystem (e.g., subsystem A 500), both selectors 504 and 506 are switched to standby AV subsystem B 502, the failed subsystem is recovered, and the APC is invoked to create, load, and execute a new playlist for the now-recovered subsystem.

As can be appreciated, if a failure occurs in West-coast delay unit 512, it needs to be bypassed by setting West-coast delay/bypass selector 514 to input 510. However, West-coast feed 516 would then be running the same programs at the same time as East-coast feed 508. To correct this, the APC is invoked with a CurrentTime equal to current time-of-day (Eastern standard or daylight savings time, as the case may be) minus three hours. The APC calculates a new playlist based on the last archived good playlist (e.g., the playlist from the East-coast feed) and loads this into the automation server for AV subsystem B 502. Additionally, West-coast selector 504 is switched to pass the output of AV subsystem B 502 to output 510. Assuming the AV sources that are part of AV subsystem B 502 still hold the content from three hours in the past, on-air operation for the West-coast feed resumes at the NewOnAirTime calculated by the APC, and the West-coast feed is synchronized with the East-coast feed delayed by three hours.

Alternatives

Although delaying feeds with respect to each other was described in the context of East- and West-coast feeds delayed by nominally three hours relative to each other, systems involving more than two feeds and alternative relative delays are within the scope and intent of the present invention, as would be understood to one skilled in the art.

Note that "creating" a playlist, as defined herein, includes modifying an existing playlist, or building a new playlist from one or more existing playlists and/or additional program segments.

Note that an "active" program segment, as defined herein, is a program segment (typically from a reference playlist) for which a specified reference time (e.g., the current time-of-day) falls within the program segment's timeslot (i.e., the period of time from the on-air time to the on-air time plus duration for the program segment). Since the AV sources for program segments have non-zero queuing delays, and since "current" program segments are determined taking into account queuing delay, according to the algorithm of FIG. 4, a current program segment is not necessarily an active program segment, and vice versa.

Note that the term "on-air" is used herein primarily in the context of broadcast systems. However, on-air, as used herein can also apply to the scheduled airing time of program segments in non-broadcast systems (e.g., point-to-point, multicast, and singlecast). As an example, on-air time could be used to denote the time a particular program segment is to be played back by a person's personal video recorder, or the on-air time could indicate the time that a server is scheduled to start transferring a program segment in or out of the server (in real or non-real time), or the time that a file server is scheduled to begin transmission of bulk email over the internet.

While some embodiments of the present invention are directed to creation of a playlist that is synchronized to a reference playlist that is currently driving an "on-air" subsystem, the same synchronization procedure can use any reference playlist. Such a reference playlist could, for example, correspond to an archived playlist (e.g., a playlist that was saved prior to a hardware failure in a subsystem or prior to corruption of the playlist), or a playlist that is executing on an alternate subsystem (e.g., a parallel standby subsystem).

Note that the term "video server" is used generically to convey a high-speed computer that can continuously stream digital multimedia content. This content is typically in MPEG-2 transport-stream format and includes possibly one or more video programs, each of which contains typically a elementary video stream and one or more elementary audio streams. Increasingly, digital multimedia content includes object-based information, including three-dimensional graphic overlays, program stream information (e.g., electronic program guides and infotainment databases), and executable applications (e.g., Java applets) for execution on remote display terminals (e.g., set-top boxes and digital TVs).

MPEG is an acronym for Moving Picture Experts Group, a committee formed by the ISO (International Organization for Standardization) to develop a standard for coded representation of moving pictures and associated audio on digital storage media. MPEG-2 is the second major version of the standard. More information on MPEG-2 can be found in JTC1/SC29/WG11, "MPEG-2: Generic coding of moving pictures and associated audio information," ISO/IEC International Standard, August 2000. ISO/IEC 13818, incorporated herein by reference in its entirety.

Also, increasingly, high-definition format MPEG-2 programs with multiple-channel surround-sound audio and alternative format video programs (e.g., DIVX, MPEG-4, Microsoft Windows Media Player, and Quicktime) are also stored on "video servers" (especially in Internet-based streaming applications).

As would be understood to one skilled in the art, the present invention, although discussed in the context of basic video and audio and SMPTE timecode controlled units, is applicable to a broad range of digital multimedia content streaming facilities (e.g., audio streaming facilities including radio broadcast, multicast, or singlecast facilities) for that content, and control mechanisms for coordination of time of presentation of content beyond SMPTE timecode (e.g., Greenwich Mean Time (GMT), program clock reference (PCR) from MPEG-2, and global positioning satellite (GPS) timebase).

While the APC of the present invention has been described in one embodiment as an application that runs on a management computer in a content sourcing facility, the APC can be embodied in a number of different ways. For example, it could be implemented as a stand-alone black box that interfaces to components within a content sourcing facility, or it can be implemented as a server that may also host other applications and operating software. The APC could also be implemented in a distributed fashion with parts of the application running on different processors within a server or server cluster or between one or more local servers and internet-based servers. The APC could also be, in whole or in part, hosted on an internet-based server operated by an application service provider, and the APC could be an application service that is subscribed to by an end user.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for automatically creating a new playlist, comprising:
   receiving a reference playlist defining a plurality of attributes for each of one or more program segments, the attributes comprising an on-air time, a start-of message, and a duration for each program segment;
   comparing at least one on-air time in the reference playlist to a specified reference time;
   identifying, based on the comparison, at least one program segment in the reference playlist that is active at the specified reference time;
   adjusting, based on the at least one identified active program segment, the on-air time, the start-of message, and the duration attributes for one or more program segments in the reference playlist to create the new playlist; and
   executing the new playlist on a second subsystem that provides failure protection for a first subsystem.

2. The invention of claim 1, wherein:
   the reference playlist corresponds to a playlist currently being executed by the first subsystem, which sources an on-air feed; and
   the specified reference time is based on the current time of day.

3. The invention of claim 1, wherein the first subsystem is a multicast subsystem.

4. The invention of claim 3, wherein the multicast subsystem is an internet-based streaming subsystem.

5. The invention of claim 1, wherein:
   the reference playlist corresponds to a playlist currently being executed by the first subsystem, which sources a first on-air feed that is intended for viewing in at least a first time zone, and
   the specified reference time is based on the current time of day in a second time zone that is different than the first time zone.

6. The invention of claim 5, further comprising executing the new playlist on the second subsystem, which sources a second on-air feed that is intended for viewing in at least the second time zone, wherein the second on-air feed is substantially a time-delayed version of the first on-air feed.

7. The invention of claim 5, further comprising:
   executing the reference playlist on the second subsystem, which sources an intermediate feed that is substantially synchronous with the first on-air feed that is sourced by the first subsystem; and
   delaying the intermediate feed using a delay unit to produce a second on-air feed that is intended for viewing in at least the second time zone, such that the difference between the start of a given program segment in the first on-air feed and the start of the given program segment in the second on-air feed is equal to the time of day difference between the first and second time zones, wherein, upon detecting a failure in the delay unit:
      the delay unit is bypassed such that the intermediate feed becomes the second on-air feed; and
      the new playlist is loaded into and executed by the second subsystem.

8. The invention of claim 1, further comprising selecting the one or more program segments in the reference playlist to adjust, taking into account a queuing delay associated with a source of each selected program segment.

9. The invention of claim 8, wherein at least one active program segment is not selected to be adjusted based on the queuing delay of the source associated with the active program segment.

10. The invention of claim 1, wherein the received reference playlist is selected from a plurality of playlists with the assistance of a rule-based playlist validator.

11. The invention of claim 10, wherein at least one of the playlists in the plurality of playlists is from a playlist archive.

12. The invention of claim 1, comprising:
   a. initializing a first variable based on the reference time plus a processing time;
   b. initializing a second variable to the value of the first variable;
   c. determining a current program segment from the reference playlist by comparing the value of the second variable with timeslots for program segments in the reference playlist;
   d. determining media type and corresponding queuing delay for the source of the current program segment;
   e. updating the value of the second variable to be equal to the value of first variable plus the queuing delay, and
   f. checking to see if the updated value of the second variable is within the timeslot for the current program segment, and, if it is not, repeating steps (c)-(e) until the updated value of the second variable is within the timeslot for the current program segment.

13. The invention of claim 12, wherein the adjusting includes:
  determining a value for a third variable by subtracting the on-air time of the current program segment from the value of the second variable;
  calculating a new start-of message attribute for the current program segment by adding the start-of message of the current program segment to the value of the third variable;
  calculating a new duration attribute for the current program segment by subtracting the value of the third variable from the duration of the current program segment, and setting a new start-of time for the current program segment equal to the value of the second variable.

14. The invention of claim 13, wherein:
  the first variable corresponds to a variable CurrentTime;
  the second variable corresponds to a variable NewOnAirTime, and
  the third variable corresponds to a variable TimePast.

15. The invention of claim 1, wherein two or more program segments are from different sources.

16. The invention of claim 1, wherein at least one of the one or more program segments is sourced by a video server.

17. An automated playlist chaser adapted to:
  receive a reference playlist defining a plurality of attributes for each of one or more program segments, the attributes comprising an on-air time, a start-of message, and a duration for each program segment;
  compare at least one on-air time in the reference playlist to a specified reference time;
  identify, based on the comparison, at least one program segment in the reference playlist that is active at the specified reference time;
  adjust, based on the at least one identified active program segment, the on-air time, the start-of message, and the duration attributes for one or more program segments in the reference playlist to create a new playlist; and
  execute the new playlist on a second subsystem that provides failure protection for a first subsystem.

18. The invention of claim 17, further comprising selecting the one or more program segments in the reference playlist to adjust taking into account a queuing delay associated with a source of each selected program segment.

19. The invention of claim 17, wherein:
  the reference playlist corresponds to a playlist currently being executed by the first subsystem, which sources a first on-air feed that is intended for viewing in at least a first time zone, and
  the specified reference time is based on the current time of day in a second time zone that is different than the first time zone.

20. The invention of claim 17, wherein two or more program segments are from different sources.

21. A content sourcing facility comprising:
  at least first and second content sourcing subsystems, each adapted to generate a subsystem stream of content; and
  an automated playlist chaser adapted to:
    receive a reference playlist defining a plurality of attributes for each of one or more program segments, the attributes comprising an on-air time, a start-of message, and a duration for each program segment;
    compare at least one on-air time in the reference playlist to a specified reference time;
    identify, based on the comparison, at least one program segment in the reference playlist that is active at the specified reference time;
    adjust, based on the at least one identified active program segment, the on-air time, the start-of message, and the duration attributes for one or more program segments in the reference playlist to create a new playlist, wherein at least one of the content sourcing subsystems, which provides failure protection for at least one other content sourcing subsystem, generates its subsystem stream of content based on the new playlist.

22. The invention of claim 21, further comprising selecting the one or more program segments in the reference playlist to adjust taking into account a queuing delay associated with a source of each selected program segment.

23. The invention of claim 21, wherein:
  the reference playlist corresponds to a playlist currently being executed by the first content sourcing subsystem, which sources a first on-air feed that is intended for viewing in at least a first time zone, and
  the specified reference time is based on the current time of day in a second time zone that is different than the first time zone.

24. The invention of claim 21, wherein two or more program segments are from different sources.

25. The invention of claim 21, wherein at least one content sourcing subsystem includes:
  an automation server adapted to execute a playlist;
  a plurality of content sources; and
  a content router coupled to the outputs of the content sources, wherein:
    the automation server is adapted to communicate information derived from the playlist to one or more of the content sources in the plurality of content sources; and
    the content router is adapted to select an output of one of the plurality of content sources and output a routed output upon which the subsystem stream of content is based.

26. The invention of claim 21, further comprising a network management station adapted to monitor the status of the subsystems and, in the event of a failure of a subsystem, report this failure to the automated playlist chaser.

27. A server comprising at least one processing unit adapted to execute:
  operating software for managing communication and file operations; and
  at least a portion of an automated playlist chaser application, wherein the automated playlist chaser application is adapted to:
    receive a reference playlist defining a plurality of attributes for each of one or more program segments, the attributes comprising an on-air time, a start-of message, and a duration for each program segment;
    compare at least one on-air time in the reference playlist to a specified reference time;
    identify, based on the comparison, at least one program segment in the reference playlist that is active at the specified reference time;
    adjust, based on the at least one identified active program segment, the on-air time, the start-of message, and the duration attributes for one or more program segments in the reference playlist to create a new playlist; and
    execute the new playlist on a second subsystem that provides failure protection for a first subsystem.

28. A method for automatically creating a new playlist, comprising:
  (a) receiving a reference playlist defining a plurality of attributes for each of one or more program segments, the attributes comprising an on-air time, a start-of message, and a duration for each program segment;

(b) comparing at least one on-air time in the reference playlist to a specified reference time;

(c) identifying, based on the comparison, at least one program segment in the reference playlist that is active at the specified reference time;

(d) adjusting, based on the at least one identified active program segment, at least one of the on-air time, the start-of message, and the duration attributes for one or more program segments in the reference playlist to create the new playlist, wherein:

(i) the reference playlist corresponds to a playlist currently being executed by a first subsystem that sources a first on-air feed that is intended for viewing in at least a first time zone; and (ii) the specified reference time is based on the current time of day in a second time zone that is different than the first time zone;

(e) executing the reference playlist on a second subsystem that sources an intermediate feed that is substantially synchronous with the first on-air feed that is sourced by the first subsystem; and (f) delaying the intermediate feed using a delay unit to produce a second on-air feed that is intended for viewing in at least the second time zone, such that the difference between the start of a given program segment in the first on-air feed and the start of the given program segment in the second on-air feed is equal to the time of day difference between the first and second time zones, wherein, upon detecting a failure in the delay unit:

(i) the delay unit is bypassed such that the intermediate feed becomes the second on-air feed; and (ii) the new playlist is loaded into and executed by the second subsystem.

29. A computer-implemented method for automatically creating a new playlist, comprising:

(a) receiving a reference playlist defining a plurality of attributes for each of one or more program segments, the attributes comprising an on-air time, a start-of message, and a duration for each program segment;

(b) comparing at least one on-air time in the reference playlist to a specified reference time;

(c) identifying, based on the comparison, at least one program segment in the reference playlist that is active at the specified reference time;

(d) adjusting, based on the at least one identified active program segment, at least one of the on-air time, the start-of message, and the duration attributes for one or more program segments in the reference playlist to create the new playlist;

(e) initializing a first variable based on the reference time plus a processing time;

(f) initializing a second variable to the value of the first variable;

(g) determining a current program segment from the reference playlist by comparing the value of the second variable with timeslots for program segments in the reference playlist;

(h) determining, by the computer, media type and corresponding queuing delay for the source of the current program segment;

(i) updating the value of the second variable to be equal to the value of first variable plus the queuing delay, and (j) checking to see if the updated value of the second variable is within the timeslot for the current program segment, and, if it is not, repeating steps (g)-(i) until the updated value of the second variable is within the timeslot for the current program segment.

30. The invention of claim 29, wherein the adjusting includes:

determining a value for a third variable by subtracting the on-air time of the current program segment from the value of the second parameter;

calculating a new start-of message attribute for the current program segment by adding the start-of message of the current program segment to the value of the third parameter;

calculating a new duration attribute for the current program segment by subtracting the value of the third parameter from the duration of the current program segment, and setting a new start-of time for the current program segment equal to the value of the second variable.

31. The invention of claim 30, wherein:

the first variable corresponds to a variable CurrentTime;

the second variable corresponds to a variable NewOnAirTime, and the third variable corresponds to a variable TimePast.

* * * * *